(12) United States Patent
Gatto

(10) Patent No.: US 6,431,444 B1
(45) Date of Patent: Aug. 13, 2002

(54) BARCODE SUPERVISORY TERMINAL

(75) Inventor: John J. Gatto, Cary, NC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/579,379

(22) Filed: May 26, 2000

(51) Int. Cl.[7] .................................................. G06K 5/00
(52) U.S. Cl. ....................... 235/380; 235/383; 235/382; 235/379; 235/375
(58) Field of Search ................................. 235/380, 382, 235/379, 375, 383

(56) References Cited

U.S. PATENT DOCUMENTS

| | | | |
|---|---|---|---|
| 4,095,739 A | 6/1978 | Fox et al. | 235/382 |
| 4,532,416 A | 7/1985 | Berstein | 235/379 |
| 4,570,223 A | 2/1986 | Yoshimoto | 364/405 |
| 4,608,486 A | 8/1986 | Berstein et al. | 235/380 |
| 4,626,990 A | 12/1986 | Komai et al. | 364/405 |
| 4,628,193 A | 12/1986 | Blum | 235/375 |
| 4,802,218 A | 1/1989 | Wright et al. | 380/23 |
| 4,816,988 A | 3/1989 | Yamanaka | 364/188 |
| 4,995,081 A | 2/1991 | Leighton et al. | 380/23 |
| 5,337,043 A | 8/1994 | Gokcebay | 340/825.31 |
| 5,526,428 A | 6/1996 | Arnold | 380/25 |
| 5,992,570 A | * 11/1999 | Walter et al. | 186/36 |
| 6,145,629 A | * 11/2000 | Addy | 186/61 |
| 6,179,206 B1 | * 1/2001 | Matsumori | 235/375 |
| 6,315,199 B1 | * 11/2001 | Ito et al. | 235/383 |

FOREIGN PATENT DOCUMENTS

JP      405325033      * 12/1993

* cited by examiner

*Primary Examiner*—Karl D. Frech
*Assistant Examiner*—Allyson Sanders
(74) *Attorney, Agent, or Firm*—Francis L. Conte, Esq.

(57) ABSTRACT

A checkout terminal includes a barcode scanner, input interface, and receipt printer operatively joined to a processor for controlling operation thereof. The processor is programmed for operating the terminal in a transaction mode using the barcode scanner to read a product barcode to conduct a purchase transaction of a product. The processor is also programmed for operating in a store mode using the barcode scanner to read an supervisor barcode on a scancard presented by a supervisor for manually supervising the purchase transaction using the interface.

15 Claims, 2 Drawing Sheets

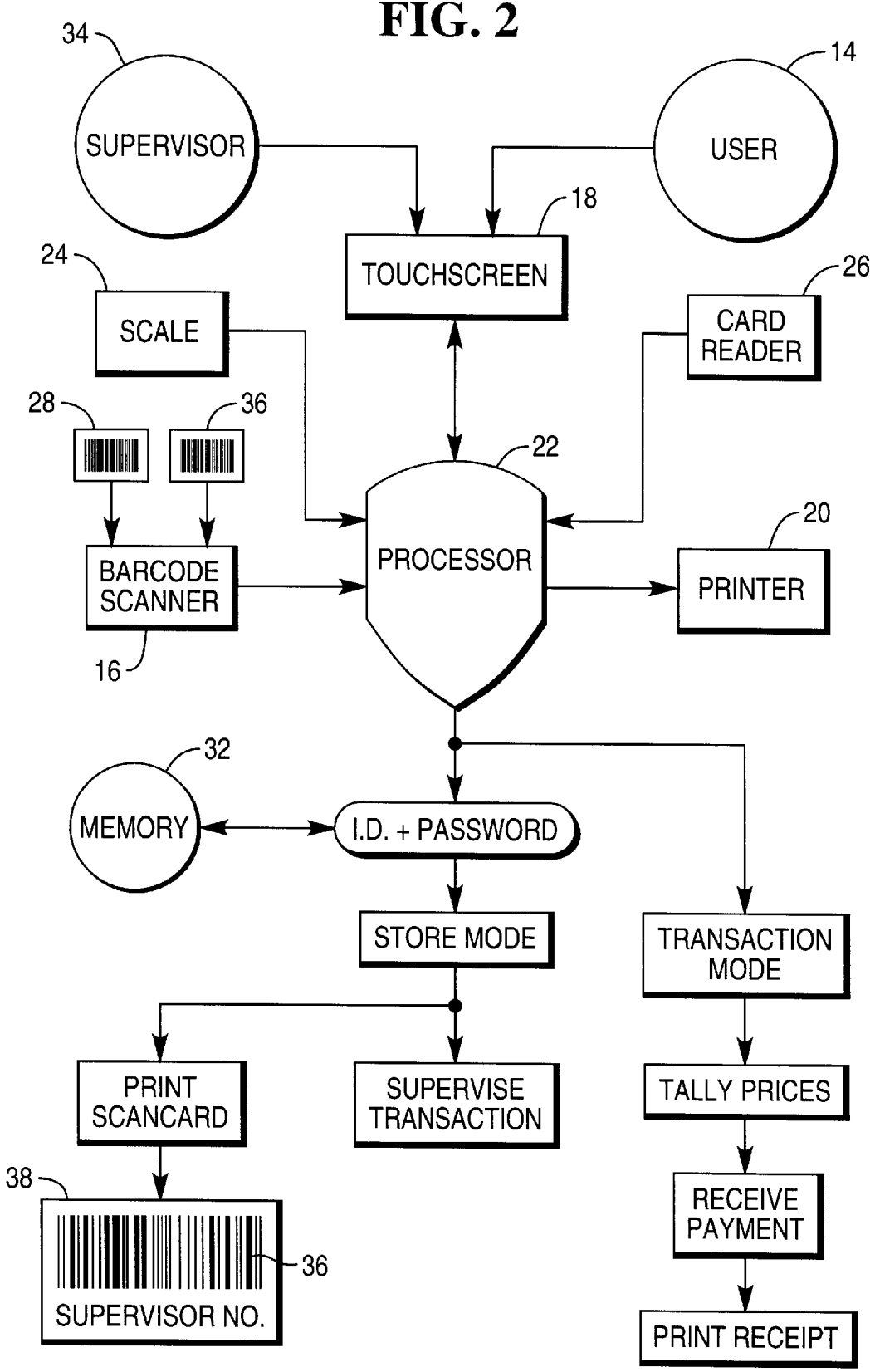

BARCODE SUPERVISORY TERMINAL

BACKGROUND OF THE INVENTION

The present invention relates generally to point of sale terminals, and, more specifically, to supervisory control thereof.

In a typical point of sale (POS) terminal, commonly known as a checkout terminal, one or more products may be presented by a customer for purchase. In the typical supermarket application, several products having barcodes thereon are read in turn by a barcode scanner, identified by the barcode thereon, and added to a list or tally for adding the prices thereof to complete the transaction.

The checkout terminal is computer controlled in most part and requires little effort by the customer or store operator in completing the purchase transaction. The individual items are simply swiped past the window of the barcode scanner and automatically read and added to the purchase list.

However, automatic operation of the terminal may be interrupted when a specific barcode is not recognized by the barcode scanner, or when a selling price is different than the regular price of the item stored in memory. For example, a specific item may be on sale and the lower sale price may not be properly entered into the lookup price database. Or, the specific item requires the manual entry of a corresponding price therefor for specifically identified products.

Furthermore, various errors may occur during operation of the terminal such as paper jams in the receipt printer, or depletion of the printing paper requiring the replacement with a new roll thereof.

A typical checkout terminal is manned by a store employee or operator who scans the products across the barcode scanner, packages the products being purchased, accepts payment for the transaction, and returns to the customer a tabulated receipt therefor.

In recent developments, self-service checkout terminals are being developed and introduced in service where the entire purchase transaction may be handled in most or all part by the customer or user themselves. The self-checkout terminal has security features contained therein which may be intentionally or inadvertently activated during customer use. Accordingly, intervention by a store operator or supervisor may be required to complete the purchase transaction for the customer.

Since the purchase of alcohol or tobacco, for example, is typically limited to adults by local laws or regulations, the purchase thereof at a self-checkout terminal will automatically alert a supervisor for assistance for ensuring the proper age of the customer.

In both types of checkout terminals described above, supervisory intervention may be required as indicated above for completing the purchase transaction. Supervisory control typically requires the supervisor to enter a supervisory or store mode of operation as distinguishable from the normal transaction mode of operation of the terminal for resolving the different types of terminal interruption. In a common form, the terminal is provided with an electrical key switch requiring the use of a common mechanical key for accessing the store mode of operation limited to certain store employees such as designated supervisors.

In another common form of supervision, each authorized supervisor has an associated supervisor identification (ID) number and a specific password suitably stored in the memory of the terminal or system memory authorizing access to the store mode when the proper ID and password are entered manually at the specific terminal.

Yet further, specifically configured electronic keys or scancards having magnetic stripes, for example, may be configured for accessing the store mode by authorized personnel.

However, these various modes of accessing the supervisory store mode of operation vary in complexity, cost, security, and ease of use.

Accordingly, it is desired to provide a checkout terminal with improved access to supervisory mode of operation.

BRIEF SUMMARY OF THE INVENTION

A checkout terminal includes a barcode scanner, input interface, and receipt printer operatively joined to a processor for controlling operation thereof. The processor is programmed for operating the terminal in a transaction mode using the barcode scanner to read a product barcode to conduct a purchase transaction of a product. The processor is also programmed for operating in a store mode using the barcode scanner to read an supervisor barcode on a scancard presented by a supervisor for manually supervising the purchase transaction using the interface.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 2 is a flowchart representation of the checkout terminal illustrated in FIG. 1 including operation thereof in transaction and store modes of operation in accordance with an exemplary embodiment of the present invention.

DETAILED DESCRIPTION OF THE INVENTION

Figure 1:
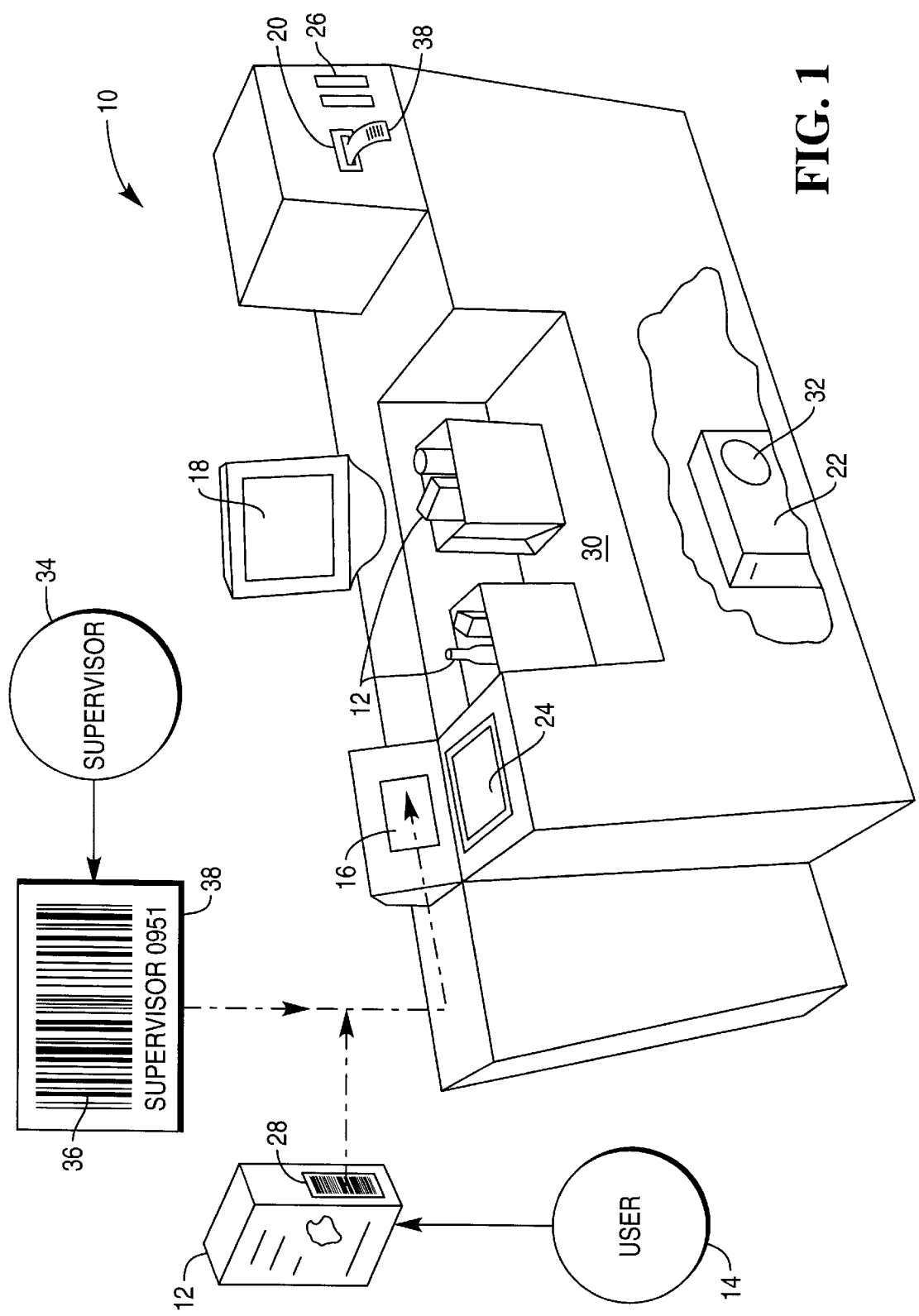
FIG. 1 is an isometric view of a checkout terminal in accordance with an exemplary embodiment of the present invention for reading both product barcodes and an operator barcode on a corresponding scancard for supervisory control of the terminal.

Illustrated in FIG. 1 is a point of sale (POS) or checkout terminal 10 specifically configured for purchasing one or more products 12 by a customer or user 14. The terminal 10 may have any conventional hardware configuration including a barcode scanner 16, an input interface 18, and a receipt printer 20 operatively joined to a digitally programmable computer or processor 22 which controls operation thereof in a conventional manner.

In a typical supermarket application of the terminal, a weighing scale 24 is also operatively joined to the processor 22. And, a magnetic stripe card reader 26 is also operatively joined to the processor 22.

The processor 22 is suitably programmed using conventional software for controlling the entire operation of the terminal for decoding corresponding product barcodes 28 on the products as they are swiped past the scanner 16 and tabulated in a corresponding purchase list. The input interface 18 is preferably in the form of a conventional touchscreen mounted atop an integral display monitor which displays the details of the transaction including a list of products being purchased and control options represented by virtual keys on the monitor. Alternatively, a mechanical keyboard may be used for inputting data, with corresponding display being provided by an independent display monitor.

Payment for the purchase transaction may be made in any suitable form including ATM debit cards or credit cards having magnetic stripes which are read by the card reader 26 when swiped therethrough.

In the exemplary embodiment illustrated in FIG. 1, the checkout terminal 10 is specifically configured for self-service operation by the customer 14, and thusly additionally includes a bagging area 30 in which the products being purchased may be immediately bagged after their barcodes have been read by the scanner 16 and added to the purchase list.

The processor 22 is specifically programmed in suitable software retained in any conventional memory 32 for operating all required functions of the terminal. The terminal may be an operator-assisted version, or a self-service version for the preferred embodiment of the invention illustrated in FIG. 1.

In accordance with the present invention, the processor 22 is conventionally programmed in a first or transaction mode of operation which uses the barcode scanner 16 to read and decode the various product barcodes 28 found on the corresponding products to conduct the purchase transaction thereof.

In a conventional method, the product barcode 28 identifies the specific product, and the decoded barcode is used to address a product lookup database containing the stored price therefor which is then listed in the running tally or list of the products being purchased by the customer. The transaction mode terminates when all the products have been read and listed and the total price therefor has been determined. Payment in any suitable form may be made therefor by electronic debiting to the ATM card or credit card read by the reader 26, or by receiving cash, where the terminal is configured therefor.

The relevant operations of the checkout terminal illustrated in FIG. 1 are shown schematically in FIG. 2.

In addition to the conventional transaction mode of operation, the processor 22 is also programmed for effecting a store or supervisory mode of operation which is otherwise conventional except for a preferred modification of the terminal and method for accessing the store mode in accordance with the present invention. As indicated above, the store mode may be accessed by an authorized store employee or supervisor 34 typically identified by a supervisor identification number (ID) and a corresponding password selected by the supervisor. The ID and password may be entered into the terminal manually using the touchscreen interface 18 in a conventional manner.

In the store mode of operation, the supervisor is allowed access to various terminal control functions not available in the transaction mode of operation. For example, the supervisor may be alerted by the terminal itself for supervising a transaction mode of operation when required for specific intervention such as entering correct prices for incorrectly scanned products, or entering product price when no price is available in the lookup database, or for correcting typical operational errors occurring during normal use of the terminal.

In the example of the self-service checkout terminal illustrated in FIG. 1, supervisor intervention may also be required for overriding the transaction mode to permit the purchase of restricted items such as alcohol or tobacco to customers meeting required age limits. Or, supervisor intervention may be required in the event of the intentional or inadvertent violation of security measures contained in the self-service checkout terminal.

As initially illustrated in FIG. 2, the processor 22 is further configured or programmed in accordance with the present invention for operating the checkout terminal in the store or supervisory mode of operation using the barcode scanner 16 to read an operator or supervisor barcode 36 printed on a corresponding scancard 38 presented by an authorized supervisor 34, as additionally shown in FIG. 1. The reading and decoding of an authorized supervisor barcode 36 permits automatic supervisor access into the store mode of operation for manually supervising the purchase transaction using the interface 18 in any desired manner.

Since the barcode scanner 16 is already part of the terminal for reading product barcodes 28 it may be used to additional advantage for automatically reading the supervisor barcode 26 for automatically entering the store mode of operation without the need for security keys or manual inputting of supervisor ID numbers and passwords.

A particular advantage of the present invention is that the processor 22 may be programmed to operate the receipt printer 20 under the store mode to print a supervisor barcode 36 on receipt paper therefrom to create the corresponding paper scancard 38 on demand. An exemplary one of the supervisory scancards 38 is illustrated in FIG. 1 being printed on demand from the receipt printer 20, which scancard 38 may then be used for being read by the scanner 16 for entering the store mode of operation. If desired, the receipt-paper scancard 38 may be separately laminated in plastic in any conventional manner for improving the durability and life of the scancard.

However, a particular advantage of the present invention is that the processor 22 may be programmed to operate the receipt printer 20 under the store mode to print a replacement scancard on demand having a new authorization barcode, such as a new password encoded therein for supplanting a previously authorized scancard. Scancards may be misplaced, or it may be desirable to periodically change passwords therefor for maintaining security of the terminal. In view of the simplicity of the scancards being formed directly by the receipt printer, the authorization numbers encoded therein, such as the password, may be changed on demand and as often as desired using the transaction terminal itself for this function. This is quickly and inexpensively accomplished, and previous scancards may be automatically disabled from further use.

As illustrated in FIG. 2, the processor 22 is preferably further programmed to operate the printer 20 under the store mode of operation to print the supervisor barcode 36 having a supervisor ID number and password encoded therein for authorizing the specific supervisor access to the store mode. Any designated supervisor may be permitted access to the store mode of operation, and permitted access to the printing of the scancards 38.

In this regard, therefore, the otherwise conventional store mode operating functions programmed in to the processor 22 are correspondingly modified to permit the additional function of operating the receipt printer to generate the scancards with the barcodes 36 thereon. Conventional software exists for printing barcodes in other applications, and may be introduced into the terminal processor 22 for specifically printing the supervisor barcode 36 for use in automatically accessing the store mode of operation.

As indicated above, the supervisor barcode 36 preferably includes an ID number for the designated supervisor and a corresponding password selected by that supervisor which may be changed at any time on demand. The ID number will normally remain constant for a specific supervisor, with the password changing as desired for maintaining security access limited to the designated supervisor.

In the preferred embodiment, the processor 22 is also programmed to encrypt the password in the supervisor barcode 36 to prevent unauthorized decoding thereof which could be used for manually entering the store mode using the touchscreen interface 18. Any form of encryption may be used such as exclusive-or using a specified string of digits corresponding in string length to the length of the desired password. The user selected password in the form of a string of digits may then be operated against the reference string in exclusive-or which effectively adds the respective digits of the strings and disregards any carryover digit 1. The password itself may then be encrypted, and is not readily deciphered without substantial expertise and effort.

A particular advantage of using the supervisor barcode 36 is that the processor 22 may be specifically programmed to automatically enter the store mode upon reading any scancard 38 having a supervisor barcode matching an authorized barcode stored in the system memory 32. The barcode scanner is programmed to read any barcode presented thereto, with recognized product barcodes being handled in the normal transaction mode of operation, and a recognized supervisor barcode automatically placing the terminal in the store mode of operation for further intervention by the supervisor.

In this way, the processor 22 is specifically programmed to operate the scanner 16 to automatically read and detect the supervisor scancard 38 in addition to the regular product barcodes 28 presented thereto.

The introduction into the terminal 10 of the additional function of responding to a supervisor barcode 36 supplements conventional operating functions thereof without adverse affect thereof. In a typical method of operation, the processor 22 may be programmed to request the need for supervisor intervention at the input interface 18 by audible alert or display of an intervention message on the display screen thereof. The store mode of operation may then be entered by an authorized supervisor who either manually enters an ID number and password through the input interface 18, or simply scans a supervisor scancard 38 at the barcode scanner 16. In this way, the supervisor may obtain quick and secured access to the store mode either upon demand by the terminal when required, or simply automatically by scanning the supervisor barcode past the barcode scanner when desired.

The checkout terminal 10 illustrated in FIG. 1 may thusly be modified in accordance with the present invention for introducing changes in programming for not only recognizing a supervisor scancard for accessing the store mode of operation, but for also printing on demand such supervisor scancards using the conventional receipt printer 20 operated in the correspondingly new manner. The so modified checkout terminal may then be used for effecting an improved method of operation providing quick and secure access to the store mode of operation of the terminal using the self-generated scancards 38.

However, the scancards could be otherwise manufactured in a more permanent form, such as rigid plastic cards, if desired but this would require increased cost and lead time, which are typically not desirable when the need for periodic changing of passwords is desired for enhancing secure operation of the terminals. On demand printing of the scancards 38 is preferred for inexpensively maintaining scancard security of the terminals by printing the scancards as often as desired.

Although the introduction of the security scancard is preferred specifically for the self-service form of checkout terminal described above, the security scancards may be used in other types of POS terminals as desired which have receipt printers capable of printing the identification barcodes.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A checkout terminal for purchasing a product by a customer, comprising:
   a barcode scanner, an input interface, and a receipt printer operatively joined to a processor for controlling operation thereof; and
   said processor being programmed for operating said terminal:
      in a transaction mode using said barcode scanner to read a product barcode on said product to conduct a purchase transaction thereof;
      in a store mode using said barcode scanner to read a supervisor barcode on a scancard presented by a supervisor for manually supervising said purchase transaction using said interface; and
      wherein said processor is further programmed to operate said receipt printer under said store mode to print a supervisor barcode on receipt paper therefrom to create a corresponding scancard.

2. A terminal according to claim 1 wherein said processor is further programmed to operate said printer under said store mode to print said supervisor barcode having a supervisor identification number and password authorizing said supervisor access to said store mode.

3. A terminal according to claim 2 wherein said processor is further programmed to encrypt said password in said supervisor barcode.

4. A terminal according to claim 1 wherein said processor is further programmed to automatically enter said store mode upon reading said scancard and matching said supervisor barcode to an authorized barcode stored in memory.

5. A terminal according to claim 4 wherein said processor is further programmed to operate said scanner to automatically read and detect said scancard.

6. A terminal according to claim 4 wherein said processor is further programmed to:
   request at said input interface intervention by said supervisor; and
   enter said store mode upon said supervisor either manually entering an identification number and password into said input interface, or scanning said scancard at said barcode scanner.

7. A terminal according to claim 1 wherein said processor is further programmed to operate said receipt printer under said store mode to print a replacement scancard on demand having a new password supplanting a previously authorized scancard.

8. A method of operating a checkout terminal including a barcode scanner, input interface, and receipt printer operatively joined to a processor, comprising:
   operating said terminal in a transaction mode using said barcode scanner to read a product barcode on said product to conduct a purchase transaction thereof; and entering a store mode of operating said terminal by using said barcode scanner to read a supervisor barcode on a scancard presented by a supervisor; and manually supervising said purchase transaction in said store mode using said interface.

9. A method according to claim 8 further comprising operating said receipt printer under said store mode to print a supervisor barcode on receipt paper therefrom to create a corresponding scancard on demand.

10. A method according to claim 9 further comprising operating said printer under said store mode to print said supervisor barcode having a supervisor identification number and password authorizing said supervisor access to said store mode.

11. A method according to claim 10 further comprising encrypting said password in said supervisor barcode.

12. A method according to claim 9 further comprising automatically entering said store mode upon reading said scancard and matching said supervisor barcode to an authorized barcode stored in memory.

13. A method according to claim 12 further comprising operating said scanner to automatically read and detect said scancard.

14. A method according to claim 12 further comprising:

requesting at said input interface intervention by said supervisor; and entering said store mode upon said supervisor either manually entering an identification number and password into said input interface, or scanning said scancard at said barcode scanner.

15. A method according to claim 14 wherein:

said customer operates said terminal in said transaction mode for conducting a self-service checkout purchase transaction; and said supervisor operates said terminal in said store mode for supervising said customer transaction.

* * * * *